United States Patent
Laplace et al.

(10) Patent No.: US 12,118,362 B2
(45) Date of Patent: Oct. 15, 2024

(54) BEHAVIORAL IMPLEMENTATION OF A DOUBLE FAULT STACK IN A COMPUTER SYSTEM

(71) Applicant: VMware, Inc., Palo Alto, CA (US)

(72) Inventors: Cyprien Laplace, Boston, MA (US); Sunil Kumar Kotian, San Jose, CA (US); Andrei Warkentin, South Elgin, IL (US); Regis Duchesne, Monts-de-Corsier (CH); Alexander Fainkichen, Southborough, MA (US); Shruthi Muralidhara Hiriyuru, Medford, MA (US); Ye Li, Cambridge, MA (US)

(73) Assignee: VMware LLC, Palo Alto, CA (US)

( * ) Notice: Subject to any disclaimer, the term of this patent is extended or adjusted under 35 U.S.C. 154(b) by 358 days.

(21) Appl. No.: 17/559,346

(22) Filed: Dec. 22, 2021

(65) Prior Publication Data
US 2023/0195470 A1    Jun. 22, 2023

(51) Int. Cl.
*G06F 9/30* (2018.01)
*G06F 9/38* (2018.01)
*G06F 9/455* (2018.01)

(52) U.S. Cl.
CPC ........ *G06F 9/3861* (2013.01); *G06F 9/45558* (2013.01)

(58) Field of Classification Search
None
See application file for complete search history.

(56) References Cited

U.S. PATENT DOCUMENTS

| | | | | |
|---|---|---|---|---|
| 5,761,491 A | * | 6/1998 | Circello | G06F 9/3861 712/E9.06 |
| 2009/0204785 A1 | * | 8/2009 | Yates, Jr. | G06F 9/30189 712/202 |
| 2011/0231710 A1 | * | 9/2011 | Laor | G06F 11/0778 718/1 |
| 2013/0336105 A1 | * | 12/2013 | Myrah | H04L 41/0672 370/216 |
| 2016/0092382 A1 | * | 3/2016 | Anvin | G06F 9/3861 710/269 |

(Continued)

OTHER PUBLICATIONS

"What are the advantages of passing a reference to an object?", Circa 2015 (Year: 2015).*

(Continued)

*Primary Examiner* — Hyun Nam
(74) *Attorney, Agent, or Firm* — Kim & Stewart LLP (57) ABSTRACT

An example method of exception handling in a computer system is described. The computer system includes a physical central processing unit (PCPU) and a system memory, the system memory storing a first stack, a second stack, and a double fault stack associated with the PCPU. The method includes: storing, by an exception handler executing in the computer system, an exception frame on the double fault stack in response to a stack overflow condition of the first stack; switching, by the exception handler, a first stack pointer of the PCPU from pointing to the first stack to pointing to the double fault stack; setting a current stack pointer of the PCPU to the first stack pointer; and executing software on the PCPU with the current stack pointer pointing to the double fault stack.

20 Claims, 8 Drawing Sheets

(56) References Cited

U.S. PATENT DOCUMENTS

| | | | |
|---|---|---|---|
| 2017/0214701 A1* | 7/2017 | Hasan | H04L 63/1433 |
| 2022/0283813 A1* | 9/2022 | Neiger et al. | G06F 9/30145 |
| 2023/0195470 A1* | 6/2023 | Laplace | G06F 9/45558 |
| | | | 712/216 |

OTHER PUBLICATIONS

"Pointer to another pointer (levels of indirections)?",. Circa 2018 (Year: 2018).*

* cited by examiner

BEHAVIORAL IMPLEMENTATION OF A DOUBLE FAULT STACK IN A COMPUTER SYSTEM

BACKGROUND

The procedure stack ("stack") is a data structure having various uses by software executing in a computer system. The stack is a last-in, first-out (LIFO) data structure. Software pushes data onto the stack with a push instruction and removes data from the stack with a pop instruction. A central processing unit (CPU) includes a register that stores a pointer to the top of the current stack in system memory. The stack pointer decrements when data is pushed onto the stack and increments when data is popped from the stack. An operating system (OS) can set up many stacks (e.g., each task can be given its own stack).

CPUs provide exceptions to interrupt program execution when detecting predefined condition(s) while executing an instruction. When an exception is signaled, the CPU halts execution of the current task and switches to a handler procedure specified by the OS that handles the exception. Before switching execution to the handler procedure, an x86 CPU can save the states of some registers on the current stack. The current stack can be the cause of the exception, e.g., a stack overflow where the stack pointer ends up pointing to an unmapped area in the system memory. In such case, the x86 CPU is unable to save register states on the current stack and generates another exception, referred to as a double fault. In response to a double fault, the x86 CPU switches the current stack to a "double fault" stack. The x86 CPU stores register states and error information in the double fault stack and switches execution to a double fault handler.

Other CPUs, such as those having a version of the ARM@v8 architecture, behave differently than x86 CPUs. ARM CPUs support four privilege levels referred to as exception levels, i.e., EL0, EL1, EL2, and EL3. The ARM CPU includes a stack pointer for each exception level (i.e., SP_EL0, SP_EL1, SP_EL2, and SP_EL3). When the ARM CPU takes an exception to ELx (x between 1 and 3 inclusive), the ARM CPU switches to using the SP_ELx stack regardless of the current stack (it could already be SP_ELx). The ARM CPU keeps some register state in the CPU (not saving the register states on the current stack as the x86 CPU does) and redirects execution flow to different exception handlers depending on the exception. The exception handler is then in charge of saving exception state while handling the exception. Switching to SP_ELx in response to an exception allows a separate stack to be maintained for initial exception handling and is useful for maintaining a valid stack when handling exceptions caused by stack overflows.

Thus, x86 and ARM CPUs have different mechanisms for taking exceptions and entering exception handlers. When porting software code from x86 to ARM, it is desirable to model the behavior of the x86 double fault on an ARM architecture to avoid significant changes in the software code.

SUMMARY

One or more embodiments provide a method of exception handling in a computer system. The computer system includes a physical central processing unit (PCPU) and a system memory, the system memory storing a first stack, a second stack, and a double fault stack associated with the PCPU. The method includes: storing, by an exception handler executing in the computer system, an exception frame on the double fault stack in response to a stack overflow condition of the first stack; switching, by the exception handler, a first stack pointer of the PCPU from pointing to the first stack to pointing to the double fault stack; setting a current stack pointer of the PCPU to the first stack pointer; and executing software on the PCPU with the current stack pointer pointing to the double fault stack.

One or more embodiments provide a method of exception handling in a virtualized computer system. The virtualized computing system includes a hypervisor executing therein, the hypervisor supporting a virtual machine (VM). The method includes: creating, by the hypervisor, a first stack and a double fault stack mapped to locations in a system memory of the virtualized computer system and associated with a physical central processing unit (PCPU) of the virtualized computer system; handling, by a second exception handler of the hypervisor, a second exception generated by the PCPU in response to execution of an instruction of a first exception handler of the hypervisor that caused a stack overflow condition of the first stack while handling a first exception generated by the PCPU; and executing, by the second exception handler, instructions to store register states of the PCPU on the double fault stack.

Further embodiments include a non-transitory computer-readable storage medium comprising instructions that cause a computer system to carry out the above methods, as well as a computer system configured to carry out the above methods

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for behavioral implementation of a double fault stack in a computer system are described. The computer system includes a central processing unit (CPU) that does not automatically switch to a double fault stack, like described above for an x86 CPU. Instead, the techniques reproduce the double fault stack behavior in software. In embodiments, a kernel allocates a double fault stack for each physical CPU (PCPU) in the computer system. When the normal stack is not usable due to a stack overflow condition, an exception handler configures the PCPU to use the double fault stack instead of the normal stack. This allows the kernel to have a valid stack when performing a crash dump or waiting for a connection to a debugger. These and further aspects of the techniques are described below with respect to the drawings.

Figure 1:
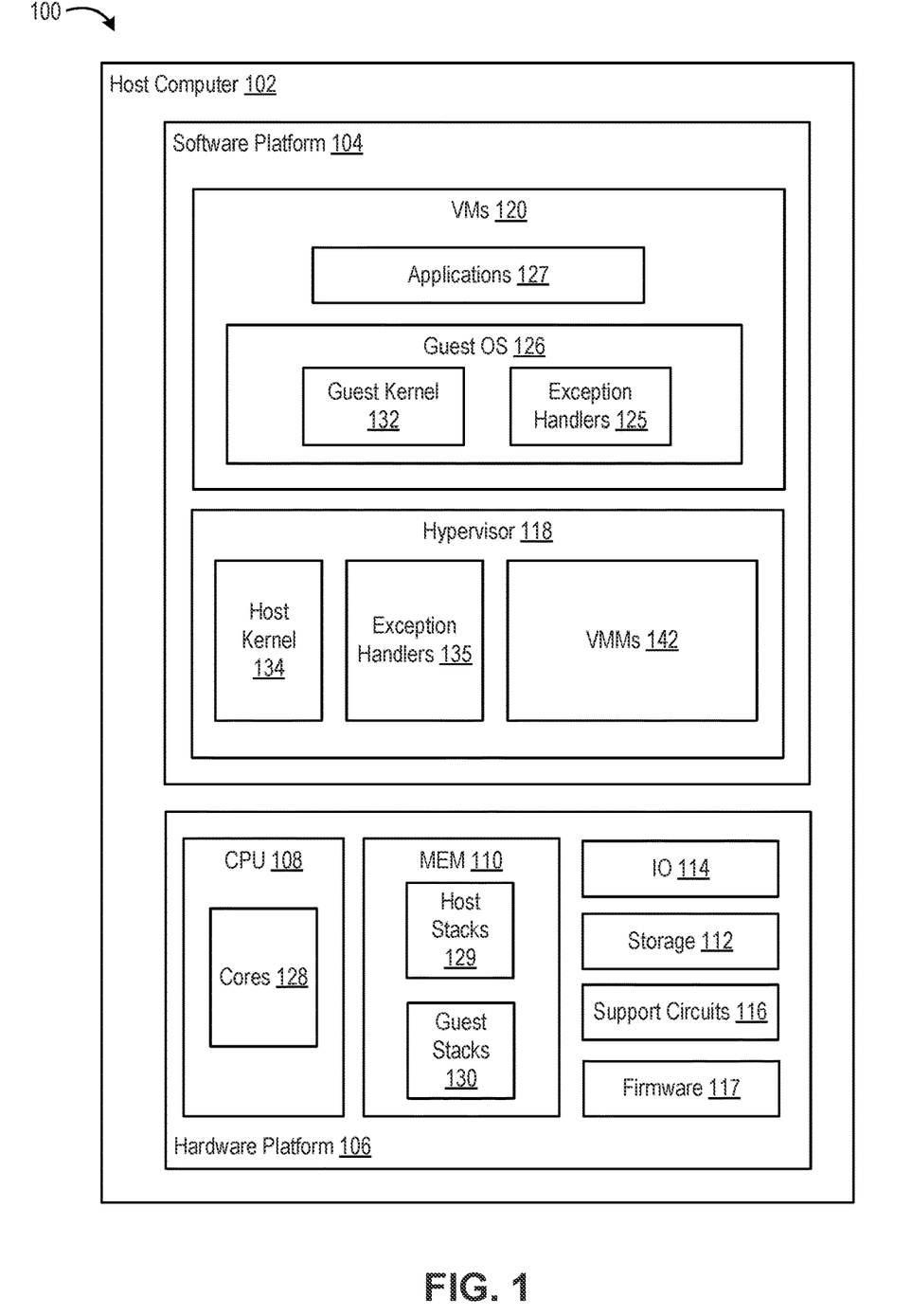
FIG. 1 is a block diagram depicting a computer system according to an embodiment.

FIG. 1 is a block diagram depicting a computer system 100 according to an embodiment. In the embodiment, computer system 100 is a virtualized computer system including a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (IO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Storage 112 in multiple hosts 102 can be aggregated and provisioned as part of shared storage accessible through a physical network (not shown). Input/output devices 114 include conventional interfaces known in the art, such as one or more network interfaces. Support circuits 116 include conventional cache, power supplies, clock circuits, data registers, and the like. Firmware 117 controls initialization of hardware platform 106 and handoff of execution to hypervisor 118 upon power on of host computer 102.

CPU 108 includes one or more cores 128 (among other components not shown for simplicity). Each core 128 is a microprocessor, such as a microprocessor compliant with a version of the ARMv8 architecture or the like. Code is executed by a core 128 at a particular privilege level (PL) of a hierarchy of privilege levels. In an embodiment, CPU 108 includes cores 128 compliant with the ARMv8 architecture or similar includes four exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, CPU 108 supports a hierarchy of at least three hierarchical privilege levels, including the user PL (PL0), the supervisor PL (PL1), and the hypervisor PL (PL2) in order of increasing execution privilege. Various examples described herein refer to a CPU having a version of the ARMv8 hardware architecture and executing in the 64-bit execution state (referred to as AArch64). It is to be understood that the techniques described herein can be employed with CPUs having similar hardware architectures and instruction sets and that such techniques are not limited for use with ARMv8 architectures.

Figure 2:
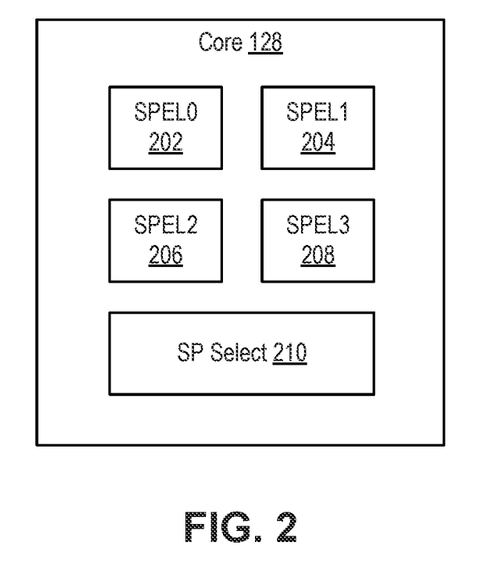
FIG. 2 is a block diagram depicting stack registers in each CPU core according to an embodiment.

FIG. 2 is a block diagram depicting stack registers in each core 128 according to an embodiment. A core 128 includes a stack pointer for each exception level, i.e., registers SPEL0 202, SPEL1 204, SPEL2 206, and SPEL3 208. Core 128 also includes an SP select register ("SP select 210"). Software configures each stack pointer to point to the top of a stack stored in system memory 110. SP select 210 selects the current stack pointer of core 128 and hence which stack is the current stack used by software executing on core 128. The choice of stack pointer can be separated to some extent from the exception level of the executing code. Taking an exception selects the stack pointer to the target exception level (e.g., SPELx, where x is 1, 2, or 3). For code at EL0, core 128 uses SPEL0 202 for the current stack. For normal code execution (no exception) at an exception level other than EL0, software can configure core 128 to use either the stack pointer associated with that exception level (SPELx) or the stack pointer associated with EL0 (i.e., SPEL0 202). Stack pointer selection during exceptions is discussed further below. For example, for an ARMv8 architecture, registers SPEL0 202, SPEL1 204, SPEL2 206, and SPEL3 208 correspond to: SP_EL0, stack pointer (EL0), SP_EL1, stack pointer (EL1), SP_EL2, stack pointer (EL2), and SP_EL3, stack pointer (EL3), respectively. Register SP select 210 corresponds to SPSel, stack pointer select.

Returning to FIG. 1, in embodiments, software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes a hypervisor 118 that supports VMs 120. One example of hypervisor 118 that may be used in an embodiment described herein is a VMware ESXi™ hypervisor provided as part of the VMware vSphere® solution made commercially available from VMware, Inc. of Palo Alto, California (although it should be recognized that any other virtualization technologies, including Xen® and Microsoft Hyper-V® virtualization technologies may be utilized consistent with the teachings herein). Hypervisor 118 includes a kernel (referred to as "host kernel 134"), exception handlers 135, and virtual machine monitors (VMMs) 142. Host kernel 134 executes at EL2. Unprivileged software of hypervisor 118 executes at EL0.

Each VM 120 includes guest software (also referred to as guest code) that runs on the virtualized resources supported by hardware platform 106. In the example shown, the guest software of VM 120 includes a guest OS 126 and client applications 127. Guest OS 126 can be any commodity operating system known in the art (e.g., Linux®, Windows®, etc.). In some cases, guest OS 126 can be an "inner" hypervisor such as ESXi (e.g., an inner hypervisor executing in a VM 120 supported hypervisor 118). Client applications 127 can be any applications executing on guest OS 126 within VM 120. Guest OS 126 includes components executing at EL0 or EL1. Applications 127 typically execute at EL0.

Host kernel 134 provides operating system functionality (e.g., process creation and control, file system, process threads, etc.), as well as CPU scheduling and memory scheduling across guest software in VMs 120 and across components of hypervisor 118. VMMs 142 implement the virtual system support needed to coordinate operations between hypervisor 118 and VMs 120. Each VMM 142 manages a corresponding virtual hardware platform that includes emulated hardware, such as virtual CPUs (vCPUs) and guest physical memory (also referred to as VM memory). Each virtual platform supports the installation of guest software in a corresponding VM 120.

Figure 3A:
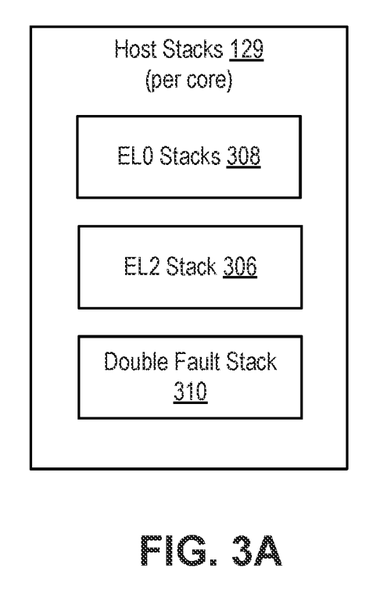
FIG. 3A is a block diagram depicting host stacks according to an embodiment.

Host kernel 134 maps pages of system memory 110 for use as host stacks 129. FIG. 3A is a block diagram depicting host stacks 129 according to an embodiment. Host stacks 129 include EL0 stacks 308, an EL2 stack 306, and a double fault stack 310 per core 128. Unprivileged code of hypervisor 118 uses an EL0 stack 308 pointed to by SPEL0 202. In embodiments, during normal execution, kernel code of hypervisor 118 uses an EL0 stack 308 pointed to by SPEL0 202. For an exception taken to EL2, core 128 switches the current stack to that pointed to by SPEL2 206, which is EL2 stack 306. As discussed further below, during a double fault condition, hypervisor 118 sets SPEL0 202 to point to double fault stack 310 and sets SP select 210 to select SPEL0 as the current stack pointer.

Figure 4A:
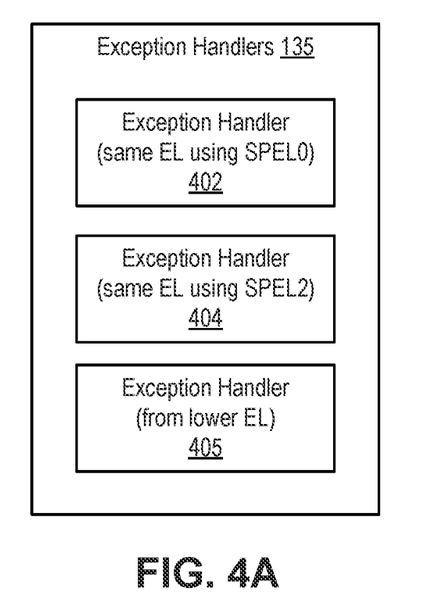
FIG. 4A is a block diagram depicting exception handlers of a hypervisor according to an embodiment.

Host kernel 134 configures core 128 to execute exception handlers 135 for various generated exceptions. FIG. 4A is a block diagram depicting exception handlers 135 according to an embodiment. Exception handlers 135 include exception handlers 402, 404, and 405. Host kernel 134 sets up an exception vector table so that core 128 calls one of the exception handlers 135 in response to a synchronous exception based on the exception level from which the exception is taken and the stack pointer in use at the time of the exception. A synchronous exception is an exception generated by executing an instruction or attempting to execute an instruction. Core 128 calls exception handler 402 when an exception to EL2 is taken from the same exception level and the current stack pointer is set to SPEL0 202. Core 128 calls exception handler 404 when an exception to EL2 is taken from the same exception level and the current stack pointer is set to SPEL2 206. Core 128 calls exception hander 405 when an exception to EL2 is taken from EL0 or EL1 (hypervisor code or guest code). Exception handlers 402, 404, and 405 may be top-level handlers that branch to specific handlers based on the type of the exception after saving the exception frame, setting stack pointer register(s), and selecting the current stack pointer.

Figure 3B:
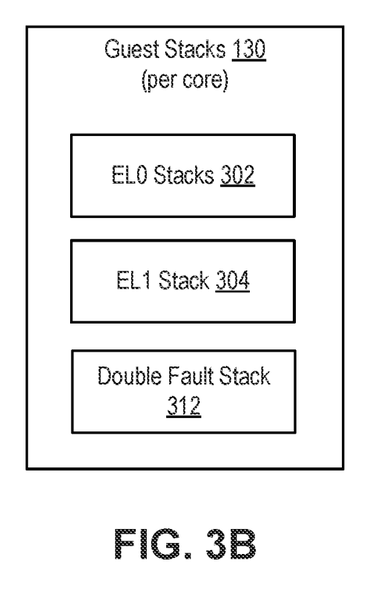
FIG. 3B is a block diagram depicting guest stacks according to an embodiment.

Guest OS 126 in a VM 120 includes guest kernel 132 and exception handlers 125. Kernel code of guest kernel 132 executes at EL1. Unprivileged code in VM 120 executes at EL0 (e.g., applications 127 and unprivileged components of guest OS 126). Guest kernel 132 maps pages of system memory 110 for use as guest stacks 130. FIG. 3B is a block diagram depicting guest stacks 130 according to an embodiment. Guest stacks 130 includes EL0 stacks 302, EL1 stack 304, and double fault stack 312 per core 128. Unprivileged code of hypervisor 118 uses an EL0 stack 302 pointed to by SPEL0 202. In embodiments, during normal execution, kernel code of guest OS 126 uses an EL0 stack 302 pointed to by SPEL0 202. For an exception taken to EL1, core 128 switches the current stack to that pointed to by SPEL1 204, which is EL1 stack 304. As discussed further below, during a double fault exception, guest OS 126 sets SPEL0 202 to point to double fault stack 312 and sets SP select 210 to use SPEL0.

Figure 4B:
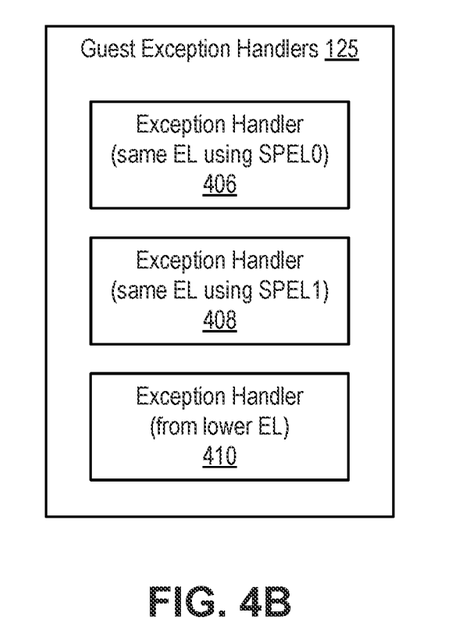
FIG. 4B is a block diagram depicting exception handlers of a guest operating system according to an embodiment.

Guest kernel 132 configures core 128 to execute exception handlers 135 for various generated exceptions. FIG. 4B is a block diagram depicting exception handlers 125 according to an embodiment. Exception handlers 125 include exception handlers 406, 408, and 410. Guest kernel 132 sets up an exception vector table so that core 128 calls one of the exception handlers 125 in response to a synchronous exception based on the exception level from which the exception is taken and the stack pointer in use at the time of the exception. Core 128 calls exception handler 406 when an exception to EL1 is take from the same exception level and the current stack pointer is set to SPEL0 202. Core 128 calls exception handler 408 when an exception to EL1 is taken from the same exception level and the current stack pointer is set to SPEL1 204. Core 128 calls exception hander 410 when an exception to EL1 is taken from EL0. Exception handlers 406, 408, and 410 may be top-level handlers that branch to specific handlers based on the type of the exception after saving the exception frame, setting stack pointer register(s), and selecting the current stack pointer.

Techniques are described below for behavioral implementation of a double fault stack associated with a core 128 of CPU 108. The techniques are described with respect to a virtualized computer system having hypervisor 118 and a VM with a guest OS 126. The double fault stack behavior is implemented by exception handlers executing at either EL1 (i.e., guest exception handlers) or EL2 (i.e., hypervisor exception handlers). While both hypervisor 118 and guest OS 126 are described as providing a behavioral implementation of a double fault stack, only one of hypervisor 118 and guest OS 126 may do so while the other does not. Further, the techniques described herein also apply to a non-virtualized computer system, where a kernel of an OS executes directly on the hardware at EL1 and there is no software in the system executing at EL2 ("host OS"). The techniques as discussed with respect to guest OS 126 apply to a host OS executing on such a non-virtualized computer system.

Figure 5:
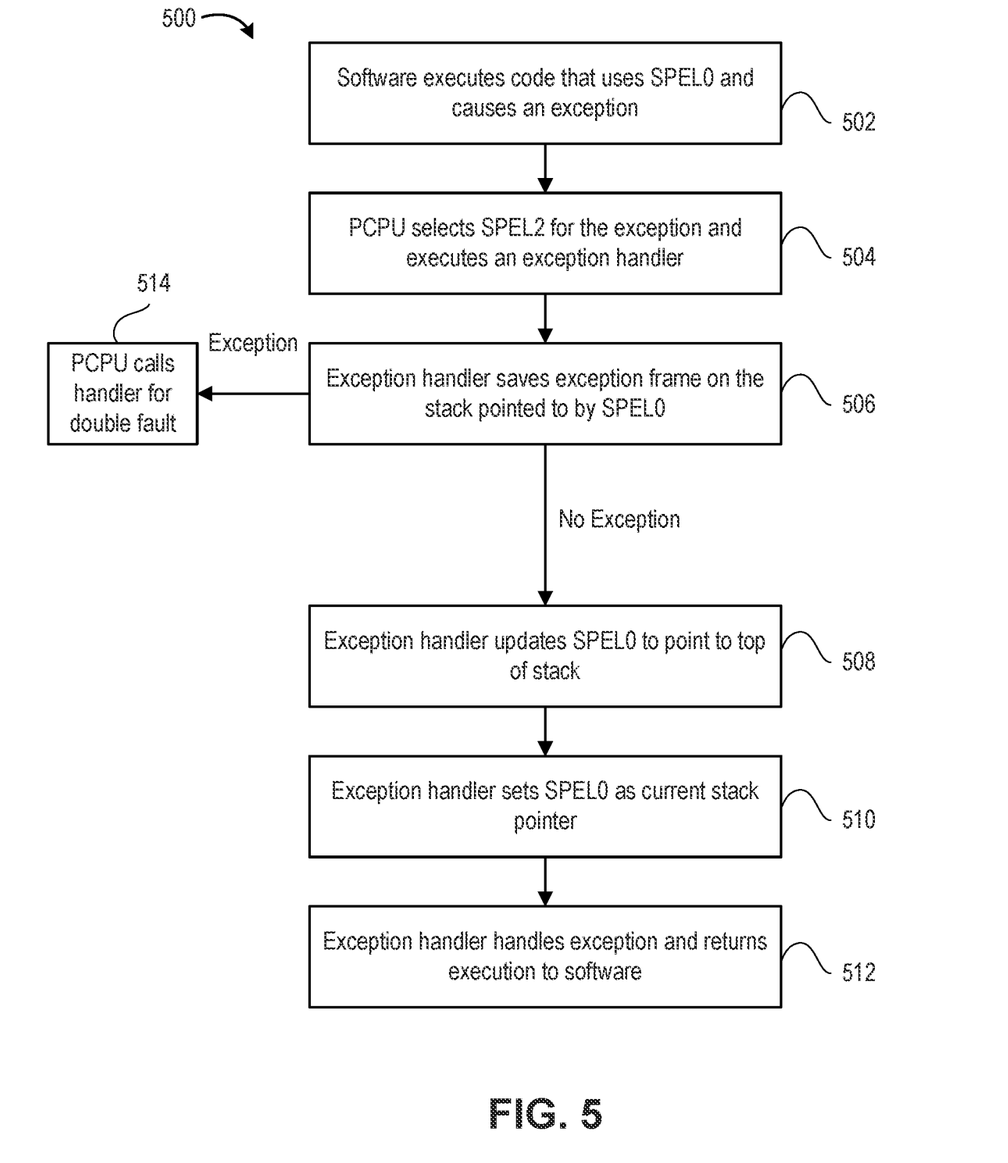
FIG. 5 is a flow diagram depicting a method of handling an exception from normal execution in a computer system according to an embodiment.

FIG. 5 is a flow diagram depicting a method 500 of handling an exception from normal execution in a computer system according to an embodiment. Method 500 is described with respect to virtualized computer system 100 but is also applicable to a non-virtualized computer system as noted above. Method 500 is also described with respect to a physical CPU (PCPU), which can be a core 128 of CPU 108. Method 500 begins at step 502, where software executes code that uses SPEL0 202 as the stack pointer to an EL0 stack and executes an instruction that causes an exception. In embodiments, the code is kernel code of hypervisor 118 executing at EL2.

At step 504, the PCPU selects SPEL2 as the current stack pointer for the exception and executes an exception handler. Since the exception is taken to EL2 and the current stack pointer points to an EL0 stack, the exception handler in method 500 is exception handler 402.

At step 506, the exception handler saves an exception frame on the stack pointed to by SPEL0 202 (e.g., the EL0 stack in use by the software that generated the exception). The exception frame includes states of selected registers of the PCPU at the time of the exception. At step 506, if the EL0 stack pointed to by SPEL0 202 has enough space for the exception frame, no further exception is generated. However, in the case that the EL0 stack pointed to by SPEL0 202 does not have enough space for the exception frame, there is a stack overflow condition. SPEL0 202 points to an address in an unmapped area of memory outside the stack, causing the PCPU to generate a page fault exception. This second exception results in a double fault condition. In case step 506 causes a stack overflow, the PCPU stops execution of the current exception handler and calls another exception handler to handle the double fault condition (step 514). If step 506 does not cause a stack overflow, the PCPU continues execution of the exception handler and method 500 proceeds to step 508. Method 500 does not include a decision step since the PCPU handles exception generation automatically not the exception handler or software.

At step 508, the exception handler updates SPEL0 202 to point to the top of the stack. At step 510, the exception handler selects SPEL0 202 as the current stack pointer for use by subsequently executed code that handles the exception. At step 512, the exception handler handles the exception and returns execution to the software. The exception handler can handle the exception by branching to a handler specific for the exception generated at step 502. The specific handler executes and returns to the exception handler, which in turn returns execution to the software that caused the exception.

Figure 6A:
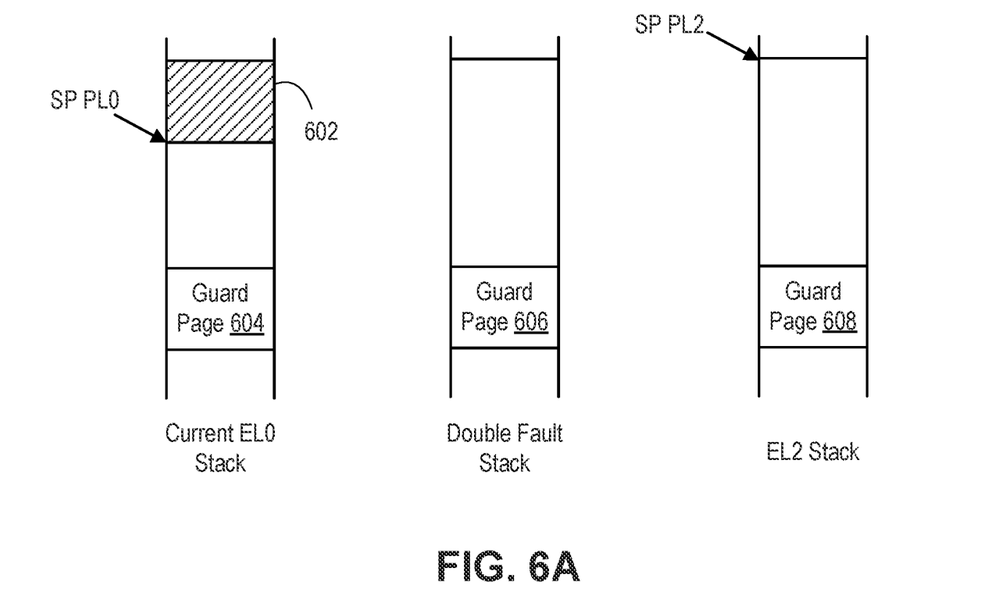
FIG. 6A is a block diagram showing stack condition during normal execution of software according to an embodiment.
Figure 6B:
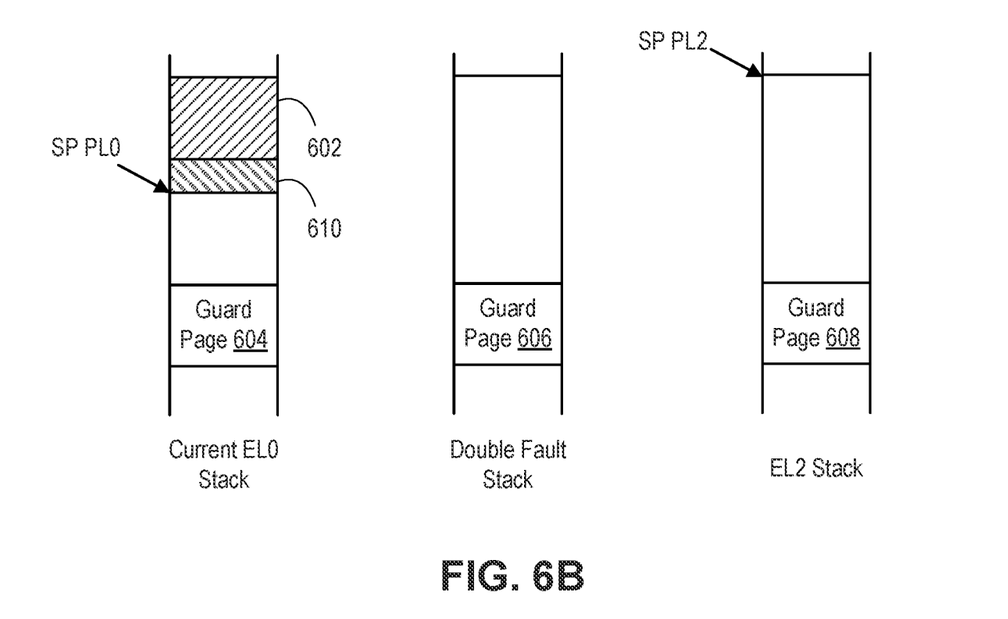
FIG. 6B is a block diagram showing stack condition after an exception is taken from normal execution of software according to an embodiment.

FIG. 6A is a block diagram showing stack condition during normal execution of software according to an embodiment. FIG. 6B is a block diagram showing stack condition after an exception is taken from normal execution of software according to an embodiment. The example of FIGS. 6A and 6B assume the exception is taken from EL2 to EL2 (i.e., the exception is from the hypervisor 118 to the hypervisor 118) and that the current stack pointer is SPEL0 202, which points to an EL0 stack.

As shown in FIG. 6A, the current EL0 stack stores some data 602 and SPEL0 202 points to its top. The current EL0 stack is one of EL0 stacks 308. The current stack includes a guard page 604, which is an unmapped page. If SPEL0 202 points to an address in guard page 604, the PCPU generates a page fault, which indicates a stack overflow condition. A double fault stack (e.g., double fault stack 310) currently stores no data and is not pointed to by any stack pointer. The double fault stack includes a guard page 606. An EL2 stack (e.g., EL2 stack 306) currently stores no data and includes a guard page 608. SPEL2 206 points to the top of the EL2 stack.

As shown in FIG. 6B, after the exception from normal execution, the double fault stack and the EL2 stack remain in the same condition. The current EL0 stack now includes an exception frame 610 and SPEL0 202 points to the top of the current EL0 stack after exception frame 610. Software executes using the current EL0 stack to handle the exception.

Figure 7:
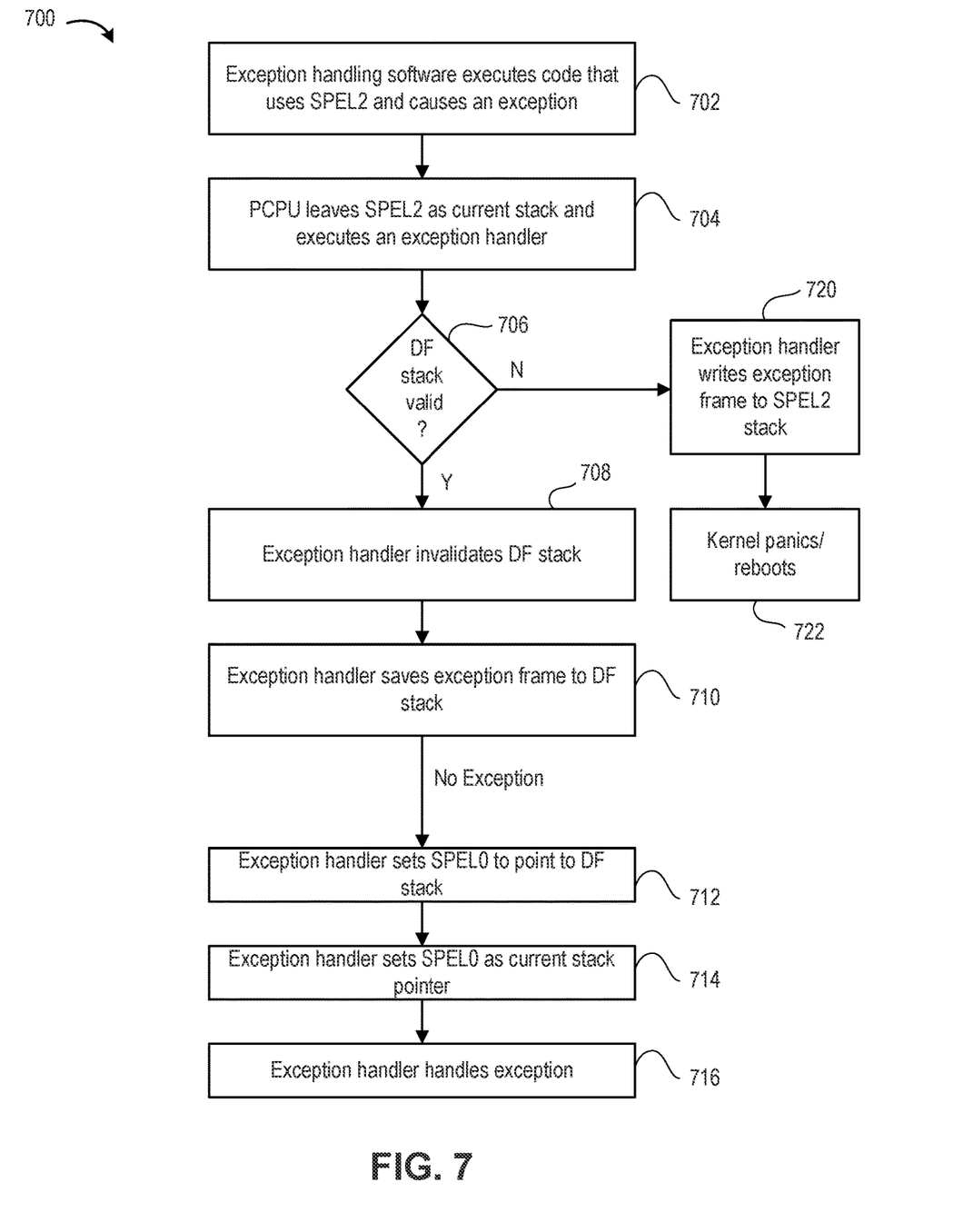
FIG. 7 is a flow diagram depicting a method of handling an exception during a double fault or triple fault condition in a computer system according to an embodiment.

FIG. 7 is a flow diagram depicting a method 700 of handling an exception during a double fault or triple fault condition in a computer system according to an embodiment. Method 700 is described with respect to virtualized computer system 100 but is also applicable to a non-virtualized computer system as noted above. Method 700 is also described with respect to a PCPU, which can be a core 128 of CPU 108.

Method 700 begins at step 702, where exception handling software executes code at EL2 using SPEL2 as the current stack pointer and executes an instruction that causes an exception to EL2. The code can be an exception handler 135 of hypervisor 118 executing at EL2. At step 704, the PCPU leaves SPEL2 as the current stack pointer and executes an exception handler. Since the exception is taken to EL2 with the current stack pointer pointing to SPEL2, the exception handler in method 700 is exception handler 404.

At step 706, the exception handler determines if a double fault (DF) stack is valid. Since the exception is taken to EL2, the double fault stack is double fault stack 310. If the double fault stack is valid, method 700 proceeds to step 708. At step 708, the exception handler marks the double fault stack as invalid. At step 710, the exception handler saves an exception frame to the double fault stack.

At step 712, the exception handler sets SPEL0 202 to point to the top of the double fault stack. At step 714, the exception handler sets SPEL0 202 as the current stack pointer for the PCPU. At step 716, the exception handler handles the exception. In the double fault condition, the exception handler can branch to the kernel (e.g., host kernel 134 or guest kernel 132), which enters a panic state and attempts to dump and save as much information about the system condition as possible. The kernel will still be able to take normal exceptions as the PCPU is using SP_EL0 as the current stack.

If at step 706 the double fault stack is invalid, method 700 proceeds from step 706 to step 720. The double fault stack is marked invalid if a second exception was handled as described above. Reaching step 720 of method 700 indicates a triple fault condition. At step 720, the exception handler writes an exception frame to the EL2 stack pointed to by SPEL2. At step 722, the exception handler branches to the kernel, which panics and reboots.

Figure 8A:
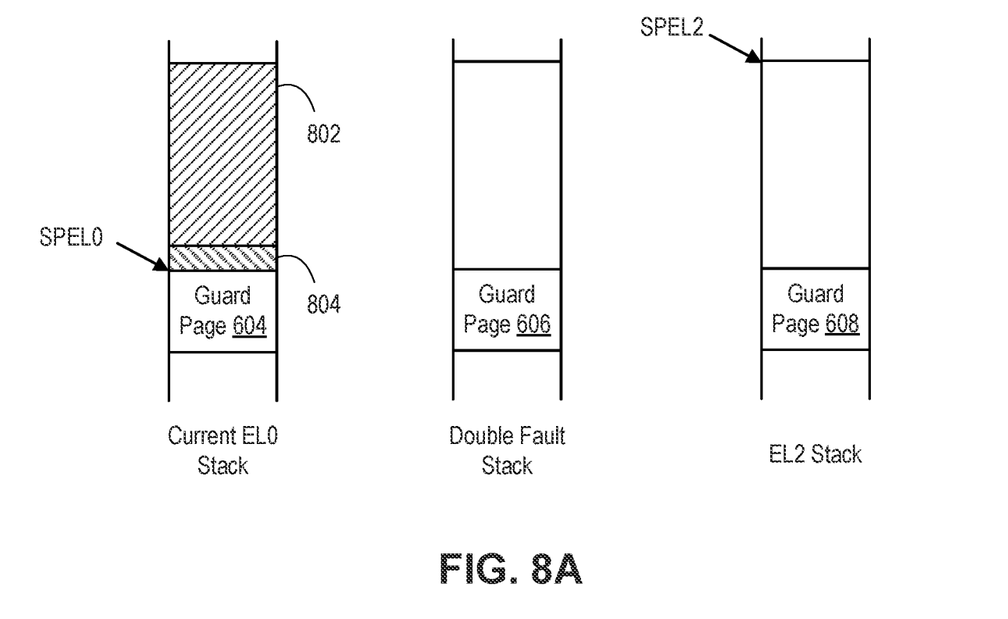
FIG. 8A is a block diagram showing stack condition during an exception according to an embodiment.
Figure 8B:
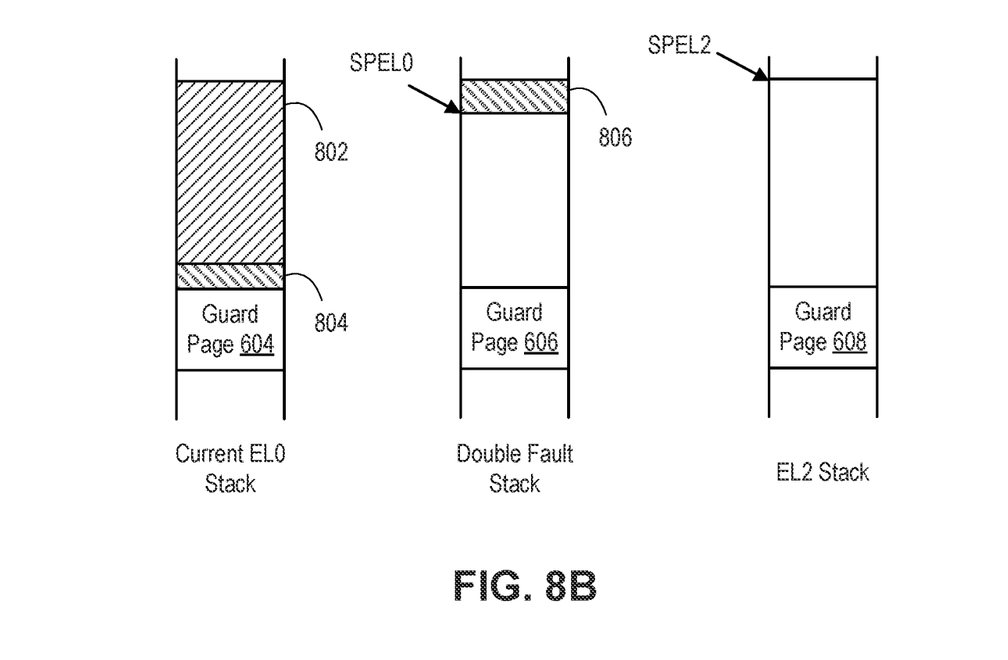
FIG. 8B is a block diagram showing stack condition after a double fault according to an embodiment.

FIG. 8A is a block diagram showing stack condition during an exception according to an embodiment. FIG. 8B is a block diagram showing stack condition after a double fault according to an embodiment. The example of FIGS. 8A and 8B assume the exception handler executes at EL2 and that the current stack pointer is SPEL2 206 when the PCPU calls the exception handler. The example of FIGS. 8A and 8B continue from the example of FIGS. 6A and 6B.

As shown in FIG. 8A, the current EL0 stack stores some data 802 and a portion of an exception frame 804. While attempting to save the exception frame to the current EL0 stack, the current stack pointer advances to an address in guard page 604 and core 128 generates an exception. At this point, the double fault stack stores no data and is not pointed to by any stack pointer. The EL2 stack is empty and SPEL2 206 points to the top.

As shown in FIG. 8B, the current EL0 stack remains as described above in FIG. 8A. However, an exception handler handled the double fault condition by storing the exception frame on the double fault stack. Further, the exception handler set SPEL0 202 to point to the top of the double fault stack and set the current stack pointer of core 128 to SPEL0 202. The EL2 stack remains empty as in FIG. 8A.

Figure 9A:
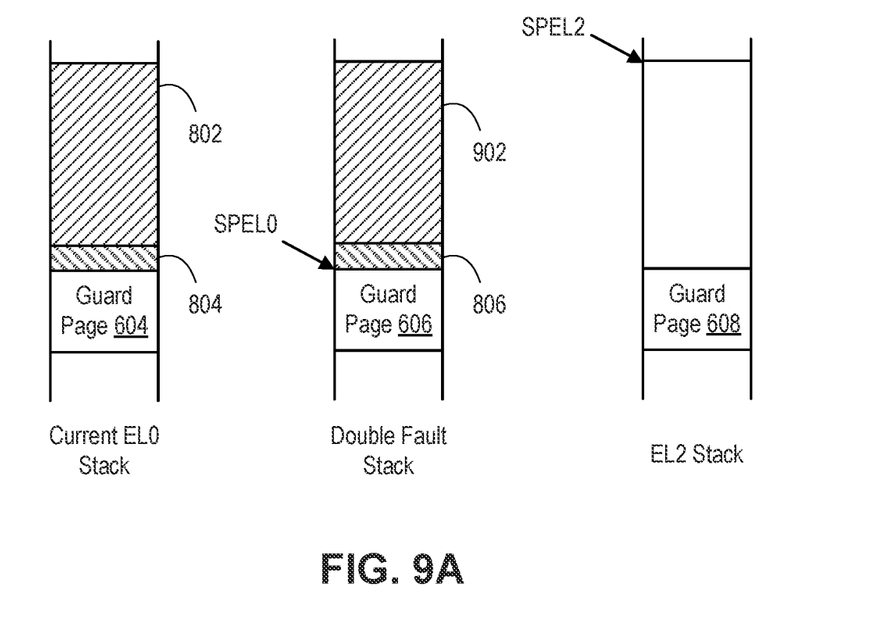
FIG. 9A is a block diagram showing stack condition during a double fault condition according to an embodiment.
Figure 9B:
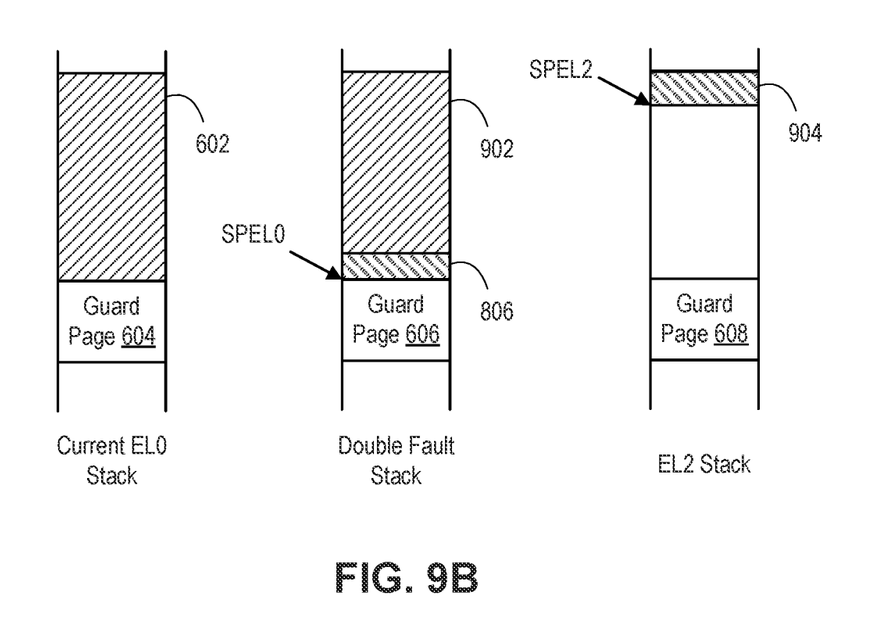
FIG. 9B is a block diagram showing stack condition after a triple fault according to an embodiment.

FIG. 9A is a block diagram showing stack condition during a double fault condition according to an embodiment. FIG. 9B is a block diagram showing stack condition after a triple fault according to an embodiment. The example of FIGS. 8A and 8B assume the exception handler executes at EL2 and that the current stack pointer is SPEL2 206. The example of FIGS. 9A and 9B continue from the example of FIGS. 6A-6B and 8A-8B.

As shown in FIG. 9A, the current EL0 stack is as shown in FIGS. 8A and 8B. The double fault stack stores data 902 and a portion of an exception frame 806. SPEL0 202 points to an address in guard page 606, which causes core 128 to generate an exception. EL2 stack remains empty and SPEL2 206 points to the top.

As shown in FIG. 9B, the current EL0 stack and the double fault stack are as described above in FIG. 9A. The exception handler stores an exception frame 904 on the EL2 stack and SPEL2 206 points to the top of the EL2 stack.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of exception handling in a computer system, the computer system including a physical central processing unit (PCPU) and a system memory, the system memory storing a first stack, a second stack, and a double fault stack associated with the PCPU, the method comprising:

calling, by the PCPU, a second exception handler in response a stack overflow condition of the first stack caused a first exception handler, the first and second exception handlers executing in the computer system;

storing, by the second exception handler, an exception frame on the double fault stack in response to the stack overflow condition of the first stack;

switching, by the second exception handler, a first stack pointer of the PCPU from pointing to the first stack to pointing to the double fault stack;

setting a current stack pointer of the PCPU to the first stack pointer; and executing software on the PCPU with the current stack pointer pointing to the double fault stack.

2. The method of claim 1, wherein the second exception handler handles page fault exceptions, and wherein the PCPU calls the second exception handler to handle a page fault exception generated by the PCPU in response to execution of an instruction in the first exception handler that attempted to write to an unmapped area of the system memory outside of the first stack.

3. The method of claim 2, wherein the page fault exception is a second exception, wherein the PCPU calls the first exception handler to handle a first exception generated by the PCPU.

4. The method of claim 1, wherein the PCPU calls the second exception handler with the current stack pointer set to a second stack pointer of the PCPU, the second stack pointer pointing to the second stack.

5. The method of claim 1, wherein the second exception handler and the software are components of a hypervisor executing on the computer system, the components executing at a hypervisor privilege level of the PCPU.

6. The method of claim 1, wherein the second exception handler and the software are components of an operating system executing on the computer system, the components executing at a supervisor privilege level of the PCPU.

7. The method of claim 1, wherein the second exception handler and the software are components of a guest operating system executing in a virtual machine (VM) supported by a hypervisor executing on the computer system, the components executing at a supervisor privilege level of the PCPU.

8. A method of exception handling in a virtualized computer system, the virtualized computing system including a hypervisor executing therein, the hypervisor supporting a virtual machine (VM), the method comprising:

creating, by the hypervisor, a first stack and a double fault stack mapped to locations in a system memory of the virtualized computer system and associated with a physical central processing unit (PCPU) of the virtualized computer system;

handling, by a second exception handler of the hypervisor, a second exception generated by the PCPU in response to execution of an instruction of a first exception handler of the hypervisor that caused a stack overflow condition of the first stack while handling a first exception generated by the PCPU; and executing, by the second exception handler, instructions to store register states of the PCPU on the double fault stack.

9. The method of claim 8, further comprising:

setting, by the second exception handler, a first stack pointer of the PCPU to point to the double fault stack and a current stack pointer of the PCPU to the first stack pointer.

10. The method of claim 9, wherein the hypervisor creates a second stack mapped to a location in the system memory and associated with the PCPU, wherein the PCPU calls the second exception handler with the current stack pointer set to a second stack pointer of the PCPU, the second stack pointer pointing to the second stack.

11. The method of claim 9, wherein:

the hypervisor creates a second stack mapped to a location in the system memory and associated with the PCPU;

the PCPU generates a third exception in response to the step of executing causing a stack overflow condition of the double fault stack;

the PCPU calls the second exception handler to handle the third exception with the current stack pointer set to a second stack pointer of the PCPU, the second stack pointer pointing to the second stack; and the second exception handler, in response to the third exception, stores the register states of the PCPU on the second stack.

12. The method of claim 8, wherein:

the PCPU supports a first exception level, a second exception level, and a third exception level in order of increasing privilege;

the first exception handler and the second exception handler execute at the third exception level;

the first exception is taken from the first exception level or the second exception level; and the second exception is taken from the third exception level.

13. The method of claim 12, wherein the PCPU generates the first exception in response to executing, at either the first exception level or the third exception level, an instruction by software of the hypervisor.

14. The method of claim 10, wherein the PCPU generates the first exception in response to executing, at either a first exception level or a second exception level, an instruction by guest software in the VM.

15. A computer system, comprising:

a hardware platform comprising a physical central processing unit (PCPU) and a system memory; and a software platform executing on the hardware platform, the software platform configured to store a first stack, a second stack, and a double fault stack in the system memory in association with the PCPU, the PCPU configured to call a second exception handler of the software platform in response to a stack overflow condition of the first stack caused by a first exception handler of the software platform, the software platform further configured to:

store, by the second exception handler, an exception frame on the double fault stack in response to a stack overflow condition of the first stack;

switch, by the second exception handler, a first stack pointer of the PCPU from pointing to the first stack to pointing to the double fault stack;

set a current stack pointer of the PCPU to the first stack pointer; and execute software on the PCPU with the current stack pointer pointing to the double fault stack.

16. The computer system of claim 15, wherein the second exception handler is configured to handle page fault exceptions, and wherein the PCPU calls the second exception handler to handle a page fault exception generated by the PCPU in response to execution of an instruction in the first exception handler that attempted to write to an unmapped area of the system memory outside of the first stack.

17. The computer system of claim 15, wherein the PCPU calls the second exception handler with the current stack pointer set to a second stack pointer of the PCPU, the second stack pointer pointing to the second stack.

18. The computer system of claim 15, wherein the second exception handler and the software are components of a hypervisor executing on the computer system, the components executing at a hypervisor privilege level of the PCPU.

19. The computer system of claim 15, wherein the second exception handler and the software are components of an operating system executing on the computer system, the components executing at a supervisor privilege level of the PCPU.

20. The computer system of claim 15, wherein the second exception handler and the software are components of a guest operating system executing in a virtual machine (VM) supported by a hypervisor executing on the computer system, the components executing at a supervisor privilege level of the PCPU.

* * * * *